(12) United States Patent
Patel et al.

(10) Patent No.: US 8,416,692 B2
(45) Date of Patent: Apr. 9, 2013

(54) LOAD BALANCING ACROSS LAYER-2 DOMAINS

(75) Inventors: Parveen Patel, Redmond, WA (US); Lihua Yuan, Redmond, WA (US); David Maltz, Redmond, WA (US); Albert Greenberg, Redmond, WA (US); Randy Kern, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 656 days.

(21) Appl. No.: 12/605,388

(22) Filed: Oct. 26, 2009

(65) Prior Publication Data

US 2010/0302940 A1 Dec. 2, 2010

Related U.S. Application Data

(60) Provisional application No. 61/182,057, filed on May 28, 2009.

(51) Int. Cl.
*H04L 1/00* (2006.01)
*H04L 12/28* (2006.01)
*H04J 3/24* (2006.01)

(52) U.S. Cl.
USPC ............................ 370/235; 370/392; 370/474

(58) Field of Classification Search ................... 370/235, 370/392, 393, 474
See application file for complete search history.

(56) References Cited

U.S. PATENT DOCUMENTS

| | | | |
|---|---|---|---|
| 6,999,462 B1 | 2/2006 | Acharya | |
| 7,272,613 B2 | 9/2007 | Sim et al. | |
| 7,296,268 B2 | 11/2007 | Darling et al. | |
| 7,333,482 B2 | 2/2008 | Johansson et al. | |
| 7,512,702 B1 | 3/2009 | Srivastava et al. | |
| 2002/0184368 A1 | 12/2002 | Wang | |
| 2003/0154236 A1 | 8/2003 | Dar et al. | |
| 2003/0204634 A1 | 10/2003 | Pinkerton et al. | |
| 2005/0050272 A1 | 3/2005 | Behrens et al. | |
| 2005/0278415 A1 | 12/2005 | Corbea et al. | |
| 2006/0002370 A1 | 1/2006 | Rabie et al. | |
| 2007/0002770 A1 | 1/2007 | Haalen et al. | |
| 2007/0147339 A1* | 6/2007 | Forissier et al. | 370/351 |
| 2007/0245352 A1* | 10/2007 | Ma | 718/105 |
| 2007/0250608 A1 | 10/2007 | Watt | |

(Continued)

FOREIGN PATENT DOCUMENTS

WO 9930460 A2 6/1999

OTHER PUBLICATIONS

Chawla, et al., "Replicating IP Services", Retrieved at <<http://reference.kfupm.edu.sa/content/r/e/replicating_ip_services_1179231.pdf>>, Technical Report 97-008, pp. 1-18.

(Continued)

*Primary Examiner* — Andrew Lee

(57) ABSTRACT

The present application relates to network configurations and specifically to scalable load balancing network configurations. One implementation includes an external client coupled to a scalable load balancing system. The scalable load balancing system includes a load balancing layer that is configured to encapsulate individual incoming packets of a packet flow from the external client. The load balancing layer is further configured to route the incoming packets to target devices on the system. The target devices can span multiple IP subnets. The incoming packets can pass through one or more load balancers of the load balancing layer before reaching individual target devices. Individual target devices can be configured to route at least some outgoing packets of the packet flow to the external client without passing through any of the one or more load balancers.

20 Claims, 11 Drawing Sheets

U.S. PATENT DOCUMENTS

| | | | |
|---|---|---|---|
| 2007/0280243 | A1 | 12/2007 | Wray et al. |
| 2008/0080552 | A1 | 4/2008 | Gates et al. |
| 2008/0310422 | A1 | 12/2008 | Booth et al. |
| 2009/0063706 | A1 | 3/2009 | Goldman et al. |
| 2009/0106529 | A1 | 4/2009 | Abts et al. |
| 2010/0306408 | A1 | 12/2010 | Greenberg |

OTHER PUBLICATIONS

"TCP Connection Forwarding", Retrieved at <<http://www.bluecoat.com/node/2804>>, pp. 4.

"Load Balancing", Retrieved at <<http://www.wilsonmar.com/1loadbal.htm>>, May 25, 2009, pp. 10.

"Softgrid Networking White paper", Retrieved at <<http://blog.caloni.net/post/369608/Softgrid+Networking+White+paper>>, May 11, 2007, pp. 2.

Bourke, Tony, "Bridge-Path vs. Route-Path Server Load Balancing", Retrieved at <<http://www.oreillynet.com/pub/a/oreilly/networking/news/bourke_1100.html>>, Nov. 11, 2000, pp. 6.

EPO Patent Appln. No. 10781358.6; European Supplementary Search Report dated Jan. 20, 2012.

Farinacci, V. et al.; "Locator/ID Separation Protocol (LISP)"; Internet Engineering Task Force, IETF; Internet Society, Geneva, Switzerland; May 26, 2009; 60 pages.

International Search Report, Mailed Date: Jan. 3, 2011, Application No. PCT/US2010/036758, Filed Date: May 28, 2010, pp. 12.

Cho, et al., "An Efficient Location and Routing Scheme for Mobile Computing Environments", IEEE Journal on Selected Areas in Communications, vol. 13, No. 5, Jun. 1995, pp. 1-11.

Gordon, et al., "Hypercube Message Routing in the Presence of Faults", SIGARCH Third Conference on Hypercube Concurrent Computers and Applications, Jan. 19-20, 1988, pp. 318-327.

Vetter, et al., "An Experimental Study of Insider Attacks for OSPF Routing Protocol", Retrieved at << http://www.ieee-icnp.org/1997/papers/1997-31.pdf >>, Proceedings International Conference on Network Protocols, Oct. 28-31, 1997, pp. 293-300.

Kallahalla, et al. "SoftUDC: A Software-Based Data Center for Utility Computing", Retrieved at <<http://ieeexplore.ieee.org/stamp/stamp.jsp?tp=&arnumber=1362586&isnumber=29851>>, Nov. 2004, vol. 37, Issue 11, pp. 38-46.

Chase, et al. "Balance of Power: Energy Management for Server Clusters", Retrieved at <<http://reference.kfupm.edu.sa/content/b/a/balance_of_power_energy_management_for_741068.pdf>> 2001, pp. 6.

Arregoces, et al. "Data Center Design Overview", Retrieved at << http://techrepublic.com.com/i/tr/downloads/home/1587050234_chapter_4.pdf>> Dec. 4, 2003, Issue 1, Cisco Press, pp. 116-157.

Al-Fares, et al. "A Scalable, Commodity Data Center Network Architecture", Retrieved at <<http://ccr.sigcomm.org/online/files/p63-alfares.pdf>>, Oct. 2008, vol. 38, Issue 4, ACM New York, NY, USA, pp. 63-74.

Chang, et al. "Load Balanced Birkhoff-Von Neumann Switches", Retrieved at <<http://ieeexplore.ieee.org/stamp/stamp.jsp?tp=&isnumber=&arnumber=923646>> 2001, pp. 276-280.

"Cisco—Data Center Ethernet", Retrieved at <<http://www.cisco.com/en/US/netsol/ns783/index.html>> May 25 2009, pp. 1-2.

"Cisco: Data center: Load balancing data center services, 2004", Retrieved at <<https://cisco.hosted.jivesoftware.com/servlet/JiveServlet/previewBody/3438-102-1-9467/cdccont_0900aecd800eb95a.pdf%3Bjsessionid=D15FC693EE8863EC7D2158BB98FFEAF8>> Mar. 2004, pp. 94.

Claffy, et al. "A Parameterizable Methodology for Internet Traffic Flow Profiling", Retrieved at << http://citeseerx.ist.psu.edu/viewdoc/download;jsessionid=84D5AA3D26226253B7F72B7F41E0EA69?doi=10.1.1.47.979&rep=rep1&type=pdf>> Retrieved May 22, 2009; pp. 1-25.

Duffield, et al. "A Flexible Model for Resource Management in Virtual Private Network", Retrieved at <<http://citeseerx.ist.psu.edu/viewdoc/download?doi=10.1.1.44.9104&rep=rep1&type=pdf>> 1999, pp. 14.

Meyer, et al. "Locator/ID Separation Protocol (LISP)", Retrieved at <<http://www.ietf.org/proceedings/07mar/slides/RRG-0.pdf>>, Mar. 17, 2007, pp. 1-21.

Greenberg, et al. "Towards a Next Generation Data Center Architecture: Scalability and Commoditization", Retrieved at <<http://conferences.sigcomm.org/sigcomm/2008/workshops/presto/papers/p57.pdf>> Aug. 2008, Seattle, USA, pp. 57-62.

Guo, et al. "DCell: A Scalable and Fault-Tolerant Network Structure for Data Centers", Retrieved at <<http://research.microsoft.com/en-us/people/chguo/dcell.pdf>> Aug. 17-22, 2008, Seattle, USA, pp. 12.

Hamilton, James. "An Architecture for Modular Data Centers", Retrieved at <<http://arxiv.org/ftp/cs/papers/0612/0612110.pdf>> Dec. 21, 2006, pp. 8.

Hamilton, James, "Cooperative Expendable Micro-Slice Servers (CEMS): Low Cost, Low Power Servers for Internet-Scale Services", In Conf. on Innovative Data Systems Research, Jan. 2009. Retrieved at <<http://www.mvdirona.com/jrh/talksandpapers/jameshamilton_cems.pdf>> Jan. 2009, pp. 8.

Handley, et. al., "TCP Friendly Rate Control (TFRC): Protocol Specification", Retrieved at <<http://www.ietf.org/rfc/rfc3448.txt>> Jan. 2003, p. 1-23.

Kim, et al. "Floodless in Seattle: A Scalable Ethernet Architecture for Large Enterprises", Retrieved at <<http://www.cs.princeton.edu/~chkim/Research/SEATTLE/seattle.pdf>> Aug. 17-22, 2008, Seattle, USA, pp. 1-14.

Kodialam, et al. "Efficient and Robust Routing of Highly Variable Traffic", Retrieved at <<http://conferences.sigcomm.org/hotnets/2004/HotNets-III%20Proceedings/kodialam.pdf>> 2004, pp. 6.

Lamport, Leslie, "The Part-Time Parliament", Retrieved at<<http://research.microsoft.com/en-us/um/people/lamport/pubs/lamport-paxos.pdf>> May 1998, vol. 16, Issue 2, New York, USA, pp. 1-33.

Mathis, et al. "TCP Extended Statistics MIB", Retrieved at<<http://www.ietf.org/rfc/rfc4898.txt>> May 2007, pp. 1-71.

Plummer, David, C."An Ethernet Address Resolution Protocol—or—Converting Network Protocol Addresses" Retrieved at <<http://www.ietf.org/rfc/rfc826.txt>> Nov. 1982, pp. 1-8.

Thaler, et al. "Multipath Issues in Unicast and Multicast Next-Hop Selection", Retrieved at << http://delivery.acm.org/10.1145/rfc_fulltext/RFC2991/rfc2991.txt?key1=RFC2991&key2=5206323421&coll=GUIDE&dl=GUIDE&CFID=37275777&CFTOKEN=95281431>> Nov. 2000, pp. 1-9.

Zhang, et al. "Finding Critical Traffic Matrices" Retrieved at <<http://www.cs.utexas.edu/~yzhang/papers/critmat-dsn05.pdf>> Jun. 28-Jul. 1, 2005, pp. 1-10.

Zhang-Shen, et al. "Designing a Predictable Internet Backbone Network", Retrieved at <<http://citeseerx.ist.psu.edu/viewdoc/download;jsessionid=648B30D83F05493B77E6595130C060E8?doi=10.1.1.59.791&rep=rep1&type=pdf>>, Retrieved May 22, 2009; pp. 6.

* cited by examiner

LOAD BALANCING ACROSS LAYER-2 DOMAINS

PRIORITY

This patent application claims priority from U.S. Provisional Application No. 61/182,057, filed on May 5, 2009.

BACKGROUND

Load balancers can be a critical piece of network infrastructure that can distribute a set of requests over a set of servers capable of processing the requests. Conventional load balancers can include pairs of devices, each of which is specialized hardware. Because of this use of specialized hardware, conventional load balancers tend to cost a lot of money. Another drawback is that they use a scale-up strategy: a single pair of load balancers can handle a number of concurrent requests limited by the capacity of the hardware. More powerful load balancers containing hardware with more capacity are purchased to handle additional requests. Direct Server Return (DSR) optimization can be useful with respect to mitigating traffic bottlenecks in a network. However, a drawback of conventional load balancers is that this technique is typically limited to a single virtual local area network (VLAN) of the network.

SUMMARY

The present application relates to network configurations and specifically to scalable load balancing network configurations. One implementation includes an external client coupled to a scalable load balancing system. The scalable load balancing system includes a load balancing layer that is configured to encapsulate individual incoming packets of a packet flow from the external client. The load balancing layer is further configured to route the incoming packets to target devices on the system. The target devices can span multiple IP subnets. The incoming packets can pass through one or more load balancers of the load balancing layer before reaching individual target devices. Individual target devices can be configured to route at least some outgoing packets of the packet flow to the external client without passing through any of the one or more load balancers.

BRIEF DESCRIPTION OF THE DRAWINGS

The accompanying drawings illustrate implementations of the concepts conveyed in the present application. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

DETAILED DESCRIPTION

Introduction/Overview

A network load balancer can assist with enhancing the utilization of resources in a network by classifying incoming packets into sessions and distributing packet traffic for individual sessions to a selected resource(s) (e.g., server(s)). To assist in mitigating bottlenecking of packet traffic at the load balancer, an optimization technique such as Direct Server Return (DSR) can be utilized. DSR allows outgoing packet traffic from the network to bypass the load balancer rather than passing through it as incoming packet traffic does. This technique, however, is typically limited to a single virtual local area network (VLAN) of the network. In contrast, FIG. 1 shows a high level view of some of the present concepts.

Network Examples

Figure 1:
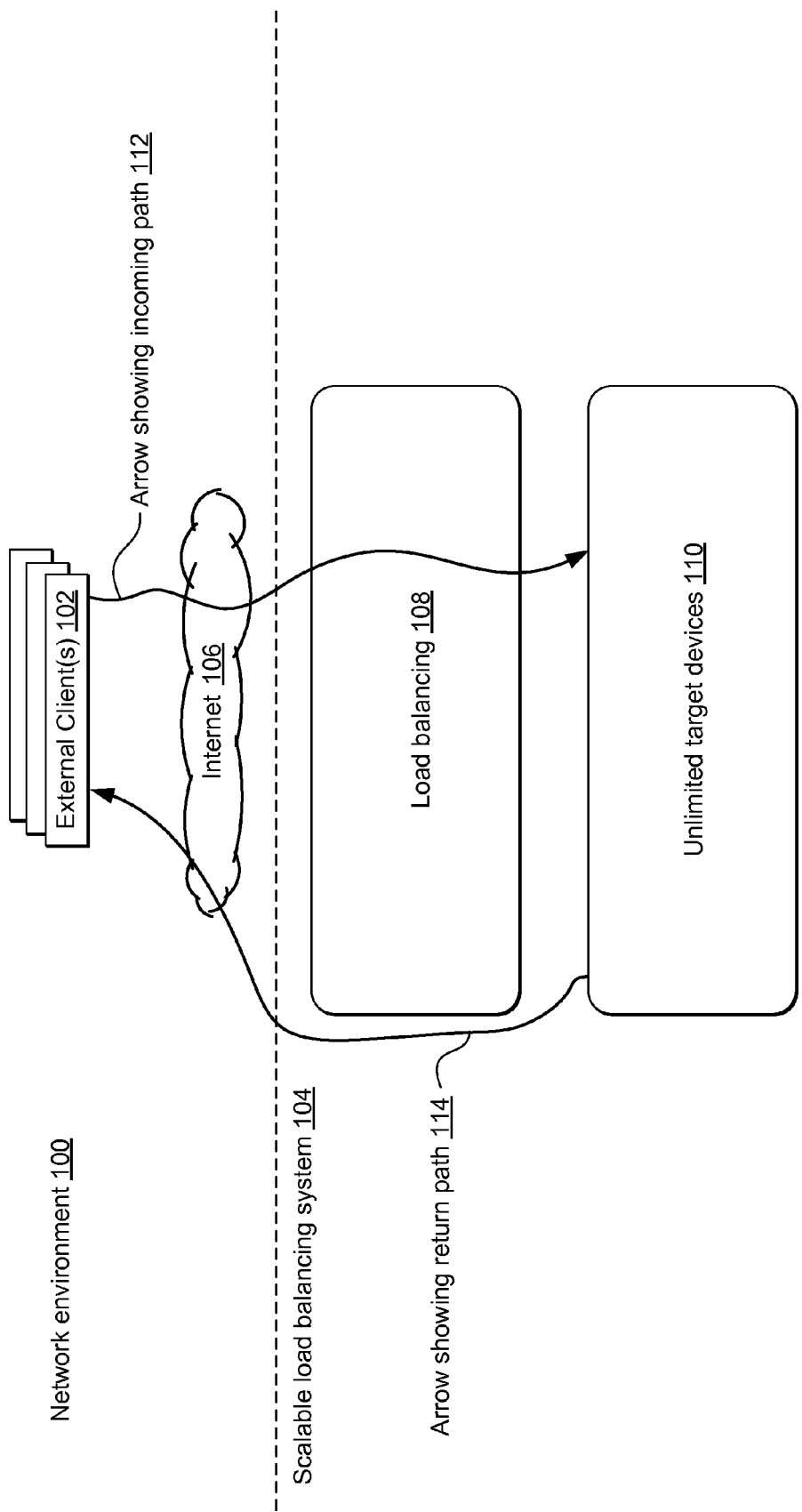
FIGS. 1-5 show network environments that can employ some of the present concepts in accordance with some implementations.

FIG. 1 shows a network environment 100 where external client(s) 102 can communicate with a scalable load balancing system 104 via the internet 106. Load balancing or spreading can be considered any suitable means by which a networking device can spread traffic across a set of valid next hops.

Scalable load balancing system 104 can include a load balancing functional layer 108 that is scalable in that it can support an essentially unlimited amount of target devices indicated at 110. In this case, the term 'essentially unlimited' can mean generally as many target devices as are desired by an entity controlling scalable load balancing system 104. For instance, the number of target devices can be tens or hundreds of thousands, or more. The load balancing functionality layer 108 is configured such that communications from external client 102 can pass through, and be distributed by the load balancing functionality to individual target devices as indicated by arrow 112. However, return communications represented by arrow 114 do not need to pass through load balancing functionality layer 108 on the way back to external client 102.

Briefly, some implementations can achieve load balancing functionality 108 utilizing inter layer-2 domain packet delivery techniques. In some cases, these inter layer-2 domain packet delivery techniques can allow load balancing optimization techniques, such as DSR, to be used across multiple IP subnets and thereby allow the use of essentially unlimited target devices 110. For scalability and other reasons, networks using the Internet Protocol can divide hosts that share a common bit prefix in their IP Addresses into an IP subnet. Typically the scope of a single subnet is confined to the scope of a single VLAN. Allowing use of target devices 110 with internet protocol (IP) Addresses from different subnets can eliminate significant limitations of previous designs for load balancers. Individual IP subnets can be associated with one of several layer-2 domains of the scalable load balancing system 104. In one or more embodiments, individual incoming packets of a packet flow can be encapsulated using, for example, IP-in-IP encapsulation. This can be accomplished, for example, by a multiplexer (MUX or Mux) of the load balancing functionality 108.

Encapsulated incoming packets can be routed to resources or target devices 110 on the scalable load balancing system 104 by passing through load balancing functionality 108 before reaching individual target devices. In at least some embodiments, the load balancing functionality can use an optimization technique, such as DSR, to reduce/minimize packet flow traffic on the load balancing functionality. The target devices (e.g., servers) can be associated with, and thus span, the multiple IP subnets or VLANs. Components (e.g., software components) associated with individual target devices can de-capsulate received incoming packets to obtain IP information. The results (outgoing packets) can then be routed out of the scalable load balancing system 104 to external client 102 (e.g., the client receiving one or more of the incoming packets) without passing through (i.e. traversing) the load balancing functionality 108. Briefly, scalable load balancing system 104 can enable new functionalities, including functionality associated with load spreading and Gratuitous Address Resolution Protocol (G-ARP). These concepts are expanded upon below.

Figure 2:
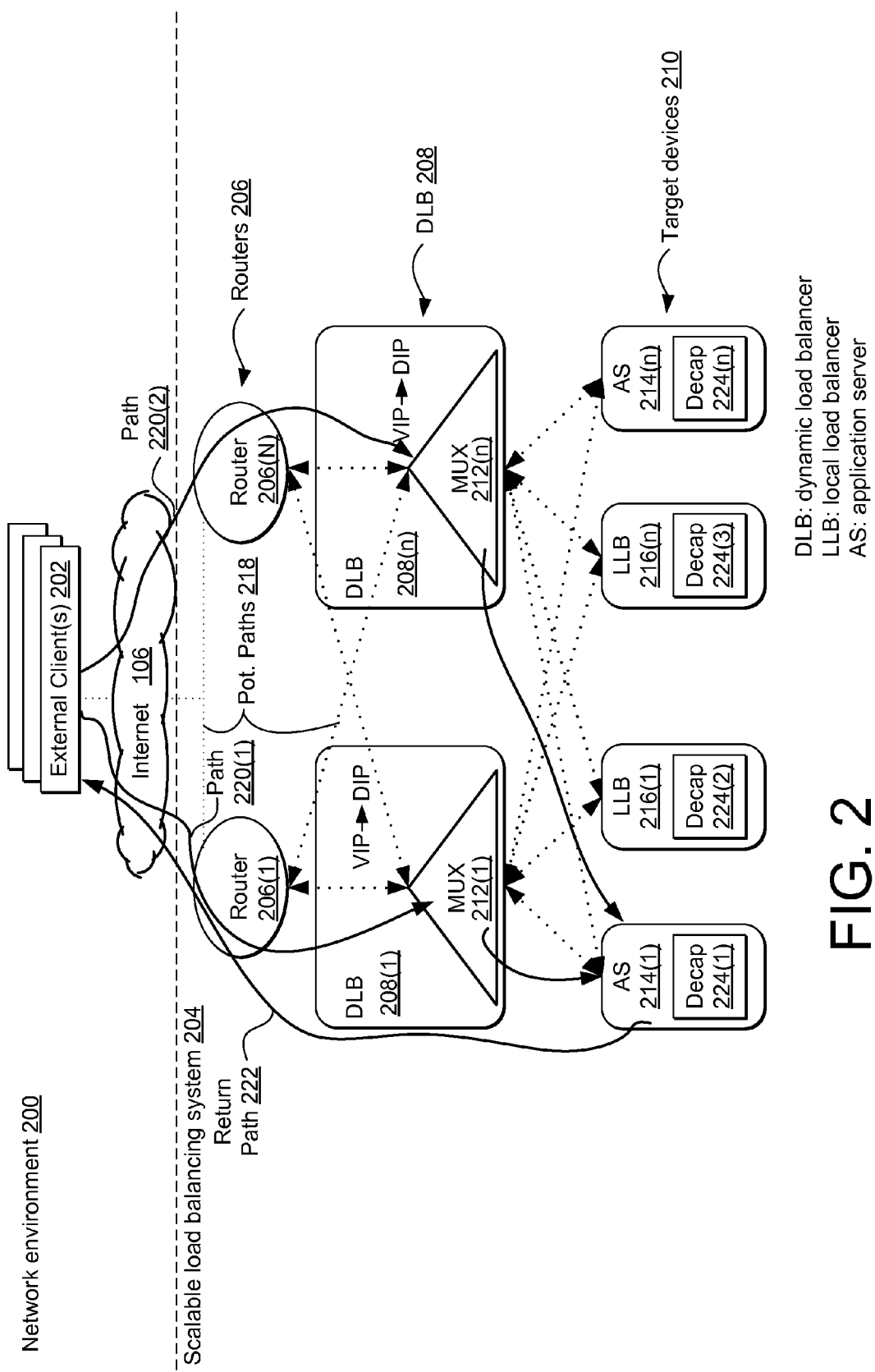

FIG. 2 illustrates another example network environment 200 according to one or more embodiments. Network environment 200 provides example structures or components that can accomplish the concepts introduced above in relation to FIG. 1. Network environment 200 can include external client(s) 202 that communicate with a scalable load balancing system 204 via the internet 106 or other network. Scalable load balancing system 204 can include a set of routers 206, a set of dynamic load balancers (DLBs) 208, and a set of target devices 210. In this instance, the set of routers 206 are manifest as routers 206(1) and 206(n). The set of DLBs 208 are manifest as DLBs 208(1) and 208(n) that include multiplexers (or MUXes) 212(1) and 212(n), respectively. The set of target devices 210 is manifest as application servers 214(1) and 214(n) and local load balancers 216(1) and 216(n).

Dotted arrows indicated generally at 218 show potential communication paths between components of scalable load balancing system 204. Bold solid arrows 220(1) and 220(2) show two potential packet flow pathways through network environment 200 from external client 202 to application server 214(1). Bold solid arrow 222 represents a return packet flow path from application server 214(1) to external client 202. For instance, bold arrows 220(1) and 220(2) can represent a search query from external client 202 that is handled by application server 214(1). As such, application server 214(1) can be termed the 'target device'. While here the target device is an application-level application server, it is to be appreciated and understood that the sample target device could additionally or alternatively be another type of target device, such as a local load balancer—an application-level load balancer for instance. It is noteworthy that while the incoming packet flow (i.e., bold arrows 220(1) and 220(2)) passes through a member of the set of DLBs 208, the outgoing return packet flow (i.e., bold arrow 222) does not necessarily pass through a load balancer and instead bypasses the DLBs. As a result, bottlenecking of packet flow traffic at one or more of the DLBs can be reduced or minimized. In at least some embodiments, this can be accomplished by utilizing a DSR optimization technique. Example DSR optimization techniques are described below.

In at least some embodiments, MUX(es) 212(1) and/or 212(n) on one or more of the DLBs 208(1) and 208(n) can use IP-in-IP encapsulation to send the packet flow to the target device 210. While specific encapsulation examples are provided, encapsulation can be any means for addressing a packet for delivery along a path or a portion of a path. In addition, a decapsulation component 224(1)-224(n) on the target device can decapsulate a packet or packets of the incoming packet flow and send the results (i.e., the outgoing packet flow) back to the external client 202. In one case, the decapsulation components 224(1)-224(n) can be manifested on the target device 210 as software components that are executable by a processor of the target device.

In this implementation, routers 206 can use Equal Cost MultiPath (ECMP) to spread packet loads across MUXes 212(1) and 212(n) of the DLBs 208. Further, the MUXes can offer consistent hashing to packets that are sent to the target devices 210. In some of the present implementations, the DLBs 208 and the target devices 210 can be implemented on a single device, such as a server(s). For instance, a single computing device, such as a server can include DLB 208(1) with MUX 212(1) and application server 214(1). In other implementations, the DLBs can be on separate devices from the target devices.

In operation, each of the DLBs 208 in this example can be configured to provide an application program interface (API) to mange virtual IP (VIP) to direct IP (DIP) mappings (e.g., VIP→{$Slot_1$, $Slot_2$, $Slot_3$, . . . , $Slot_N$}) of a VIP-DIP map. Individual slots are assigned to a DIP. A single DIP can appear multiple times in this VIP to DIP map. This VIP to DIP map can be referred to as a VipMap.

While described above as a mapping between a single VIP address and list of DIP addresses, it should be understood that each address may also be associated with a port number (e.g., a transmission control protocol (TOP) port such as port 80). In this generalization, a VIP address or VIP address and port number can be mapped to a list consisting of entries that are either a DIP address alone or a DIP address and a port number. A single DIP address may appear multiple times, either alone, with a different port number, or with the same port number, in any combination. There may also be multiple VIP or VIP, port number combinations that map to the identical lists of DIPs and DIP, port number combinations. The individual MUXes 212(1)-212(n) of the DLBs 208 can each be configured to hash header fields from the individual incoming packet flow packets and send the individual packets to an appropriate IP address associated with the target device(s) 210. For example, consider an example incoming packet. One or both of the DLBs can hash the example incoming packet and choose a slot (e.g., {$Slot_1$, $Slot_2$, $Slot_3$, . . . , $Slot_N$} by computing:

$$Slot_i = Hash(packet\ header\ fields)\ modulo\ N$$

where N is the number of slots in the VIP-DIP map. The MUX(es) of the DLB(s) can then send the example incoming packet to an address indicated in $Slot_i$. A potential advantage of this design is that packets that are part of the same flow (e.g., a TCP flow where all packets share the same 5-tuple of IP source address, IP destination address, TCP source port, TOP destination port and IP protocol number) can be forwarded to the same target device 210, regardless of which DLB 208 processes the packet.

Figure 3:
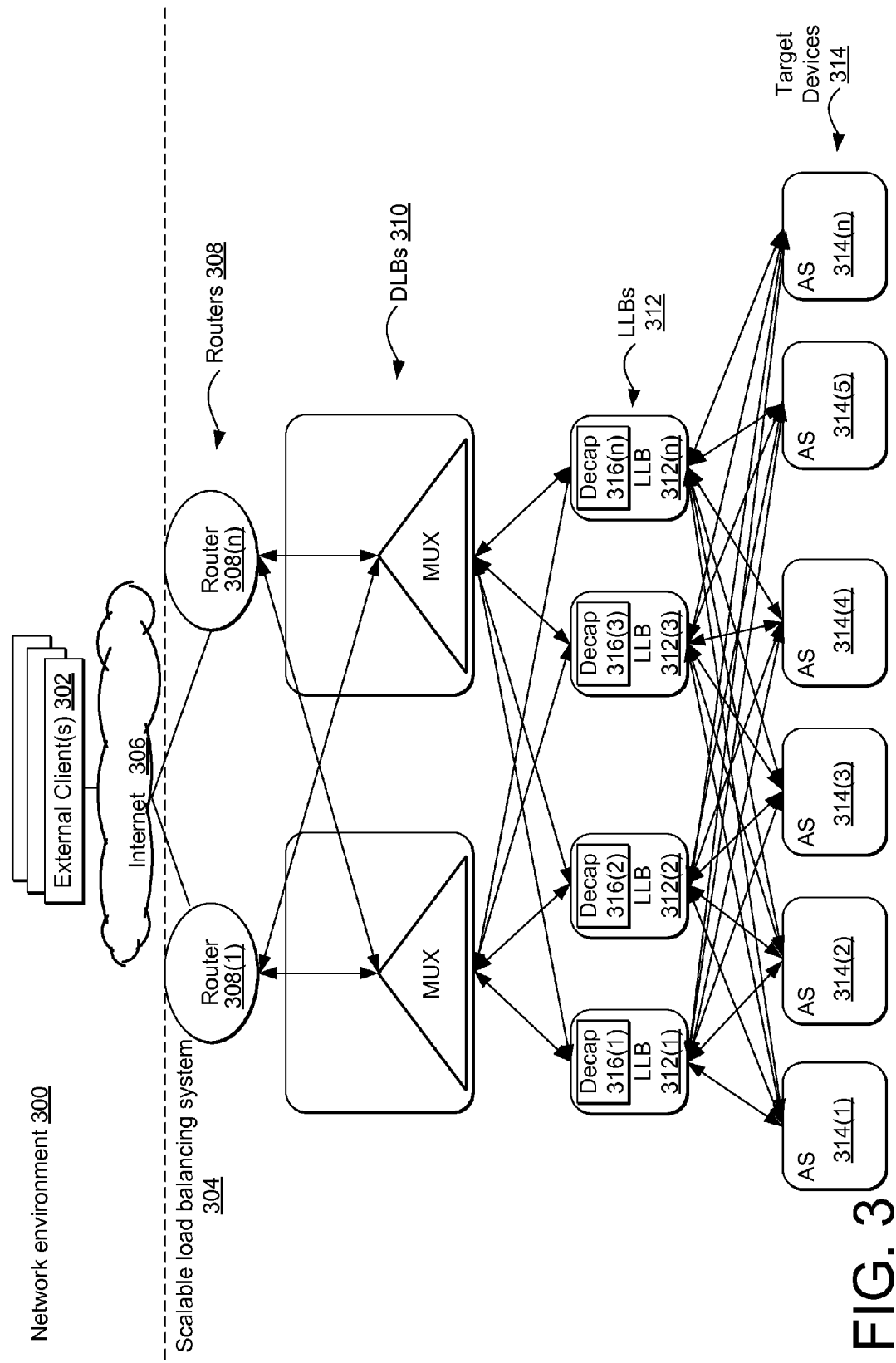

FIG. 3 illustrates another example network environment 300 that offers an alternative to network environment 200 described above. Briefly, network environment 300 is similar to network environment 200. However, in network environment 300, the local load balancers (LLBs) can be thought of as an intervening layer between the DLB and the target devices. Specifically, network environment 300 includes an external client 302 that communicates with scalable network balancing system 304 via the internet or other network 306. Network balancing system 304 includes a router layer 308, a DLB layer 310, a LLB layer 312, and a target device layer 314. In this case, the target device layer 314 includes application servers 314(1)-314(n). LLB layer 312 includes LLB's 312(1)-312(n).

Decapsulation components 316(1)-316(n) are resident on LLBs 312(1)-312(n), respectively. In this configuration, the external client's communication can be encapsulated at the DLB layer 310 and decapsulated upon receipt at the LLB layer 312. The communication can then be forwarded to the appropriate application server 314(1)-314(n). Any return communication to external client 302 can bypass the DLB and LLB layers 310 and 312, respectively. Bypassing the DLB and LLB layers can avoid potential bottlenecks and/or conserve system resources for incoming communications.

Figure 4:
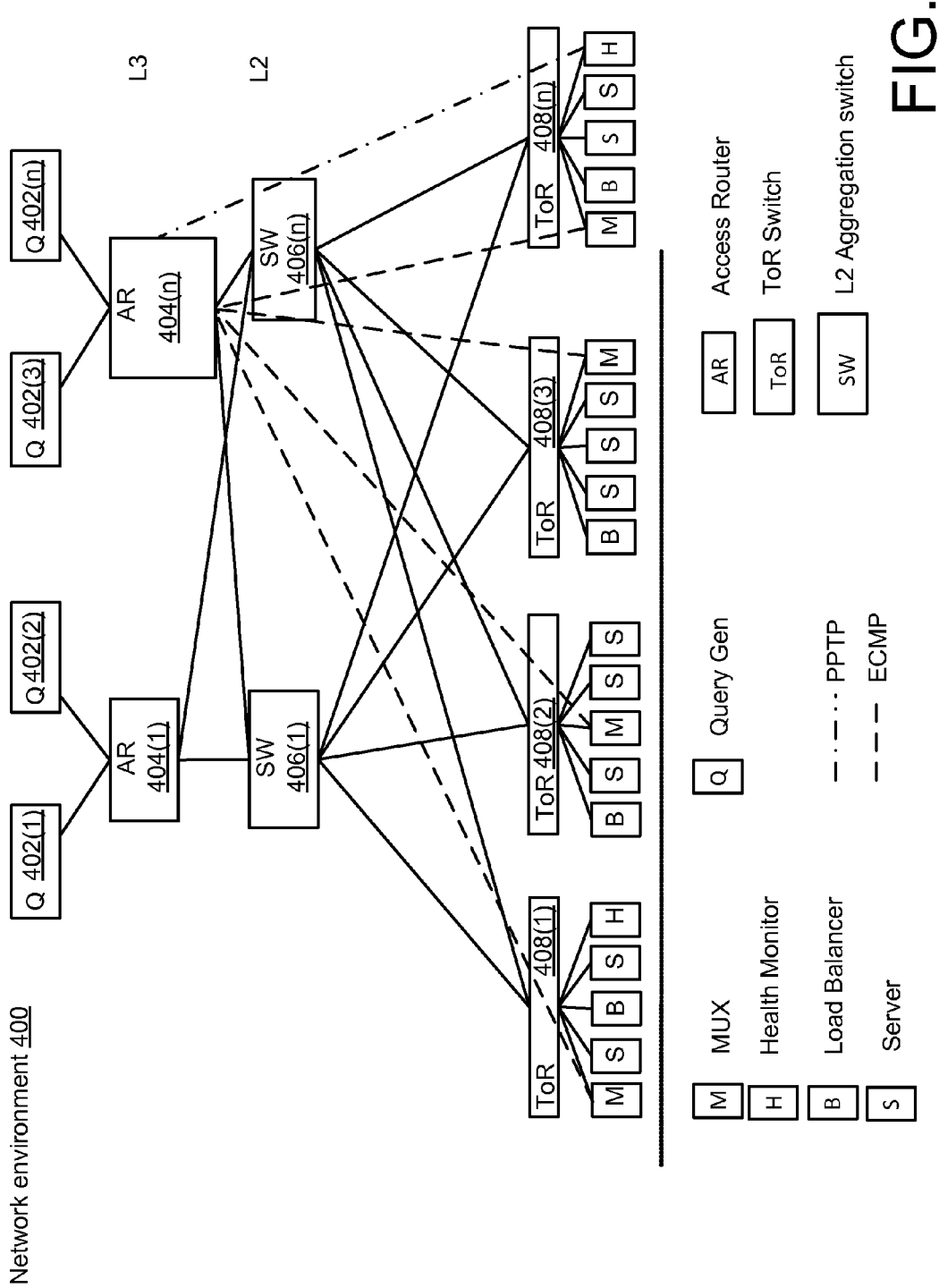

FIG. 4 illustrates another high level example of components of a network environment 400 of a scalable load balancing system. In this instance, these components include query generators 402(1)-402(n), access routers (AR) 404(1)-404(n), layer-2 aggregation switches 406(1)-406(n), and top of rack (ToR) switches 408(1)-408(n). The ToRs can communicate with various server rack components such as MUXes (M), health monitors (H), servers (S), load balancers (B).

For a VIP1 serving a particular service, the ARs 404(1)-404(n) can be configured with N routes, each of these routes points its next-hop to an intermediate IP (IIP) address (IIP1 to IIPN) that has the same cost. On the AR, the routes may all be next hops for the VIP. Therefore, the AR may evenly distribute the traffic among the N IIP addresses. These routes could be configured as static routes on the AR with equal metrics (i.e., equal-cost static routes (discussed below relative to FIG. 5)). Alternatively, these routes could be dynamically established via a routing protocol (e.g., Border Gateway Protocol (BGP) or Open Shortest Path First (OSPF)) speaker with the appropriate session with the AR. In addition, the AR can be configured to announce the VIP. IIPs may be partitioned across the MUX's (M). A MUX, in addition to its own IP address (MIP), may also be configured with one or more IIP address so that it can answer the ARP request for the IIPs configured. Therefore, individual MUX may receive a share of forwarded traffic. Upon receiving a packet, the individual MUX can run a consistent hashing algorithm to select one active DLB to forward the traffic.

The MUX's may use the same consistent hashing algorithm based on the same set of active DLBs. Therefore, a packet can be forwarded to the same DLB no matter which MUX receives it from the AR 404(1)-404(n). Note than when a new DLB is added or removed from the pool, this can trigger some local configuration change; however, existing connections can be preserved.

Figure 5:
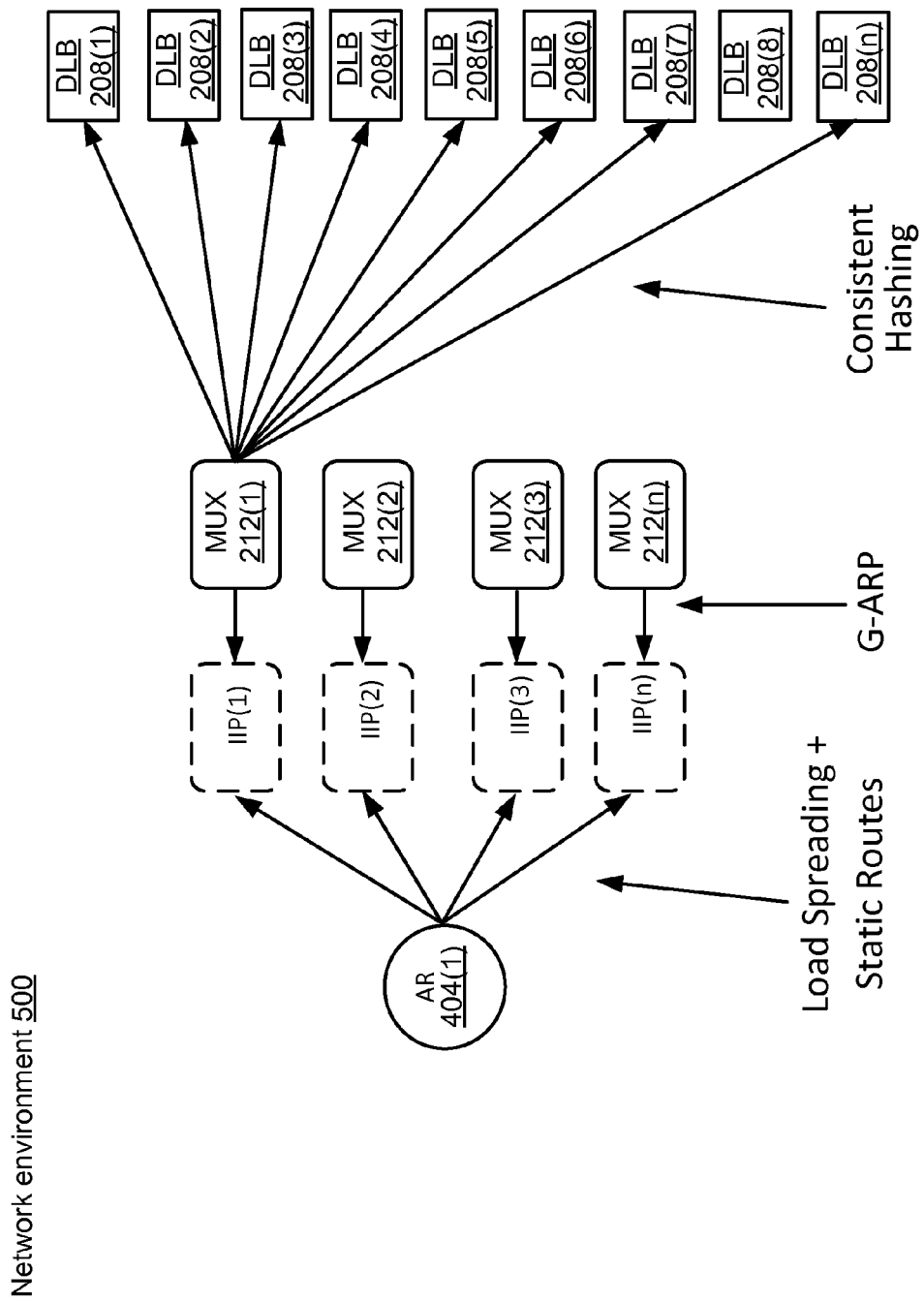

FIG. 5 shows a network environment 500 and associated technique for configuring N equal-cost static routes. In this case, network environment 500 includes an access router 404(1) (introduced in FIG. 4), IIP(1)-IIP(n), MUXes 212(1)-212(n) and DLBs 208(1)-208(n) (introduced in FIG. 2). Network environment 500 can configure N equal-cost static routes for each VIP. The NEXT HOP of these equal-cost static routes point to an Intermediate IP (IIP) address IIP(1)-IIP(n). These IIP addresses may be drawn from a separate address pool independent of VIP and DIP pool. This implementation can also turn on load spreading so that traffic will be equally distributed to the N IIP address.

In another embodiment, a routing protocol, such as a BGP connection to the routers could be used to inform them of the MUXes that are alive and taking packets for each VIP.

Various implementations can address the issue of how to preserve long-running connections as MUX modules come and go. An approach utilized in some implementations can be to retain the state for individual flows handled at every MUX, and give a copy of this state to individual MUXes as they are added to the scalable load balancing system. In order to handle the addition or removal of MUXes without breaking existing connections, one alternative is for state information to be created whenever a new connection is first handled by any MUX. This state can be shared among MUXes either directly by a peer to peer mechanism or indirectly by sending it to a logically centralized store from which any MUX needing to handle packets for a connection can determine the DIP to which other MUXes have sent that connection's packets.

An alternative implementation that requires much less sharing of state, and so which may be much more scalable, is for the MUXes to be either forwarding packets using a current mapping between VIPs and DIPs (i.e., a VipMap) or in a transition period where they are changing from forwarding packets using one VipMap (V) to forwarding packets using another VipMap (V'). In this embodiment, the MUXes can be made to agree on V, V' and their current transitioning state (that is, whether they are in the state of transitioning between V and V' or they have all begun using only V' for all packets). When not in transition, all MUXes forward all packets using the current VipMap. When in transition, the MUXes create a piece of local state whenever they see a packet for a new connection (e.g., a TCP SYN packet). When forwarding packets other than those indicating a new connection, the MUX sees if it has state for that connection. If it has state, the MUX forwards the packet using the new VipMap V', otherwise, it forwards the packet using the old VipMap V.

Briefly, in at least some configurations, the MUX 212(1)-212(n) may have the following major components: (1) the IIP module which claims ownership of an IIP to the router and receives traffic for that IIP, (2) the consistent hashing module which determines which DLB 208(1)-208(n) to forward the traffic, (3) the packet rewriter that modifies the packet, (4) the local DLB monitor. Any or all of these components can be implemented on readily available (i.e., commodity) servers and/or on the routers in various implementations. MUX components are described in more detail below relative to FIGS. 6-8.

The IIP module (IIP(1)-IIP(n)) may be responsible to register the MUX 212(1)-212(n) to the router through the ARP protocol. Basically, the IIP module may establish on the router an IP-MAC mapping of the IIP address and the MUX MAC address.

Consider example function 'bool AddIP (IP Address iip)': In this example function, the IIP address can be added up as a secondary IP address on the MUX interface. Note that it is possible for a MUX to have multiple secondary IP addresses. 'AddIP( )' may cause the MUX network stack to send 3 gratuitous ARP (G-ARP) requests, which can update the router's ARP table (or triggers IP address conflict detection on itself).

For purposes of explanation, consider example function "RemoveIP (IPAddress iip)": This example function may remove the IIP address from the MUX interface. Consider also example function "SendARP( )" This example function may force sending a G-ARP request. This G-ARP request may be sent as a precautionary measure for correctness of the IIP-MAC mapping.

G-ARP and Address Conflict Detection

When adding an IP address to the interface, the operating system (OS) can broadcast a G-ARP (within the same L2 domain). This G-ARP request may ask for the IP address it is claiming. If no other machine replies with this IP address, the IP address may be added successfully. Otherwise, an IP address conflict can be detected and the MUX stack may prevent the machine from claiming this IP address. This can happen if another MUX has claimed the IIP (e.g. failover) and failed to remove it. This scenario can be handled through external measures (e.g. by switching off the defending machine).

When a new MUX, for purposes of example, MUX "B" needs to replace MUX "A" (e.g., because planned downtime of MUX A and/or system failure at MUX A) the new MUX B may add the IIP(s) of MUX A to its own interface.

In at least one embodiment, a module such as described above may direct packet flows to one or more stateful modules in a pool of servers, where the stateful module may keep per flow state. In this case, the inbound packets may flow routes from client to module to stateful module to target server that handles the associated request. The outbound flow may route from target server to stateful module to the client. Per flow state at the stateful module may enable individual stateful modules to apply policy at flow level to support additional load balancing features. In particular, the stateful module can, for example, inspect cookies or URLs to customize the load balancing to the target server to depend on the application, on the client request, and/or on the role and/or the load and/or conditions on servers and network elements. This embodiment may be advantageous because it can spread out CPU and state intensive workloads to as many servers as necessary.

In at least one embodiment, the module can adapt its routing to the stateful module to depend on information deeper than header information carried in TCP/IP and application headers. In particular, to support a direct access function, such as in Windows 7®, the module can learn or participate in cryptographic protocols, enabling decryption of portions of a packet. The stateful module's choice of target server can then depend on these decrypted portions. The mechanism can be constructed so that the target server returns the outbound flow to the stateful module that is able (and potentially most appropriate) to handle it. This may benefit from the use of programmable CPUs to implement the module.

In at least one embodiment, the module may include the original destination address in some part of the packet header, such as an Internet Protocol (IP) option, and send the packet to the target device. The target device can extract this information from the packet header and use it to send outgoing packets directly to the source (e.g., an external client), where some of the packets do not pass through the module.

Figure 6:
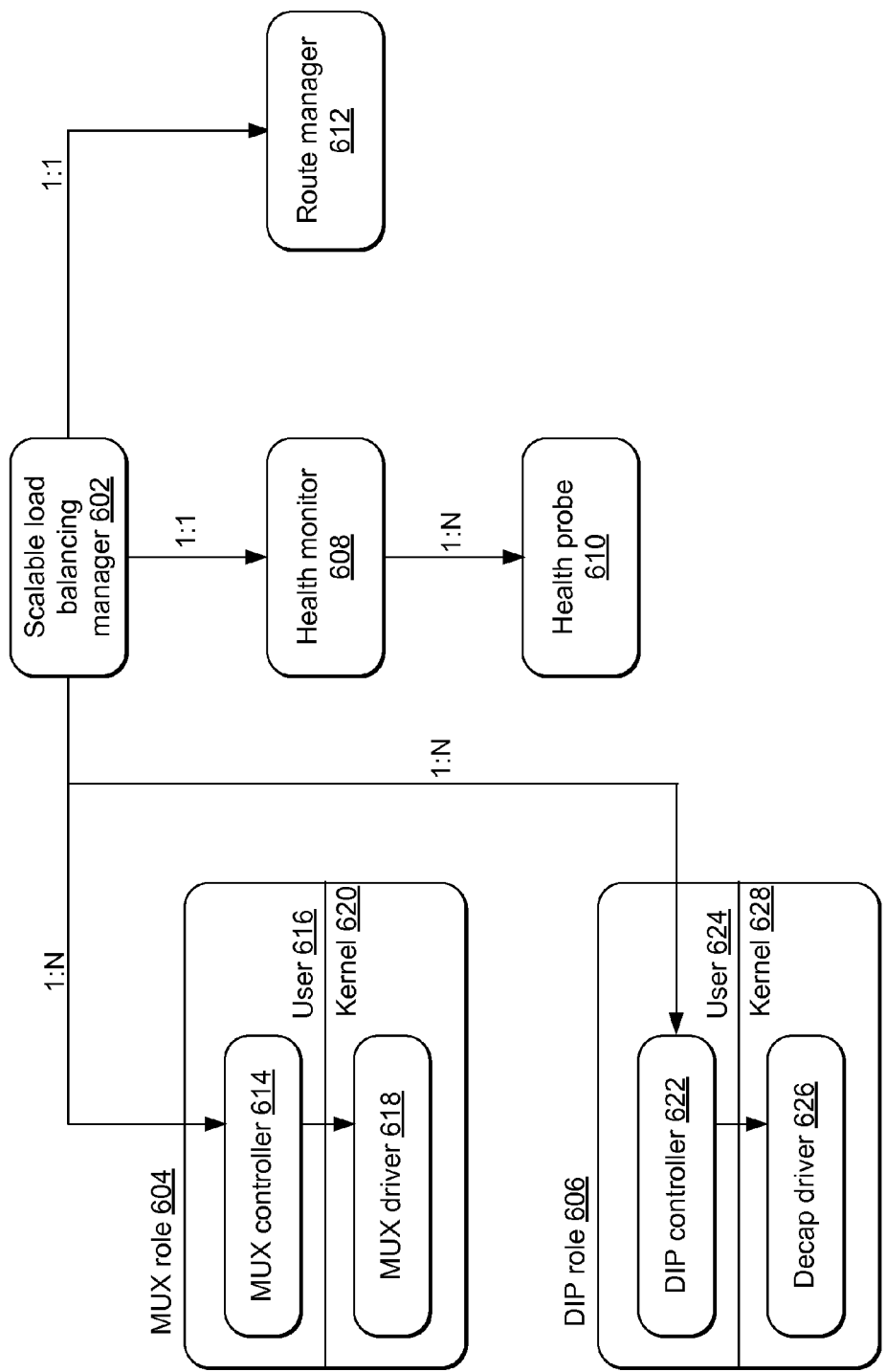
FIG. 6 shows a scalable load balancing architecture that can employ some of the present concepts in accordance with some implementations.

FIG. 6 shows an example scalable load balancing system architecture 600 that can accomplish the concepts described above and below. In this case, scalable load balancing system architecture 600 can include a scalable load balancing manager 602, a MUX role is represented at 604 and a DIP role is represented at 606. Load balancing system architecture 600 can further include a health monitor 608, a health probe 610, and a route manager 612. The MUX role 604 can involve a MUX controller 614 operating in a user mode 616 and a MUX driver 618 operating in a kernel mode 620. The DIP role 606 can involve a DIP controller 622 operating in a user mode 624 and a decap driver 626 operating in a kernel mode 628.

Scalable load balancing manager 602 can be thought of as the entry point for interactions with scalable load balancing system architecture 600. Scalable load balancing manager 602 can provide an API that can be used to manage an instance of the scalable load balancing concepts. A scalable load balancing instance can be specified using an XML configuration or an API.

Scalable load balancing manager 602 can be responsible for configuring VIP:DIP mapping on MUX machines and ensuring that the MUX machines stay in sync. Furthermore, scalable load balancing manager 602 can also facilitate preservation of long-running connections when DIPs are added or gracefully removed from a pool. This feature is described in more detail below relative to FIG. 9.

To increase availability, the scalable load balancing manager 602 can be replicated and a master selection algorithm can be used to ensure consistency of state.

A MUX role 604 may be configured with one or more Intermediate IP Addresses (IIPs). As mentioned above relative to FIG. 4, a router, such as router 404(1) may be configured to forward towards a set of IIPs the packets destined to a VIP. The MUX configured with a given IIP will perform the MUX processing for packets forwarded towards that IIP.

MUX controller 614 can control the MUX driver 618. The MUX controller can export a web services API that is used by the Scalable Load Balancing Manager 602 to control the MUX. In some implementations the MUX controller can perform the following functionality:
 1. download VIP:DIP map to the driver;
 2. inform the driver of long-running connections;
 3. collect statistics from the driver;
 4. configure IIP on the network interface;
 5. send out G-ARP packets on the network for the specified IIP to attract to the MUX any packets forwarded towards the IIP by routers or other hosts on the network.

MUX driver 618 can implement the base packet modification functionality. The MUX driver can hash the header fields of incoming packet, pick up a DIP for it based on the hash value and the current VIP map and encapsulate the packet for delivery. In addition to the map, the MUX driver 618 can also maintain a cache of hash:DIP mapping of all long-running connections for every VIP.

DIP controller 622 can control the decap driver 626 on the DIP machine. Similar to the Mux Controller 614, the DIP controller 622 can export a web services API that is used by the scalable load balancing manager 602 to control and query the DIP machine. In some implementations, the DIP controller 622 can perform the following functions:
 1. configure the VIPs on a loopback interface;
 2. configure decap for specified VIPs;
 3. query the DIP machine for currently active connections;
 4. query the health of the DIP machine (this is optional depending on the health monitor implementation).

Decap driver 626 can decapsulate IP-in-IP packets that are destined to the specified VIP. This feature helps to avoid breaking on-going communications with specific applications. For example, if there is an application that is using raw sockets to send IP-in-IP (e.g., a virtual private network VPN app), then the decap driver 626 does not decapsulate those.

Route manager 612 can be responsible for configuring the routers when MUX machines are added or removed from the pool. The route manager can use a routing protocol, such as OSPF or BGP, or an interface to configure static routes on the routers.

Health monitor 608 can be responsible for maintaining the health state of MUX and DIP machines and possibly for routes involved in request processing. Toward this end, the health monitor can monitor one or more network parameters that may be of value in determining the health of the network and/or network components. The scalable load balancing manager 602 can use the health monitor 608 as the authoritative source of health information about MUXes and DIPs. If the health monitor 608 notifies the scalable load balancing manager 602 about a health change event, the scalable load balancing manager can take appropriate action of adding or removing that node from the corresponding pool.

Viewed from one perspective health monitor 608 may be employed to monitor the health of MUXes, DLBs and/or the routes to those machines.

In at least some implementations, health monitor 608 can consist of three modules, a VPN dialer, a MUX monitor, and a DLB monitor. DLB may provide a HTTP interface. Health monitor 608 may employ various kinds of health probes 610 to establish the health of target components. For example, the health monitor may send an "http get" to fetch a small text/xml file from DLB. If the file contains the 'magic word' the health monitor and DLB agreed upon, then the health monitor may consider that the DLB is up and running, and determine if a DLB or MUX is running as expected. Furthermore, in at least some embodiments, the health monitor components may live on separate devices than the MUX devices.

Health probe 610 can be used by health monitor 608. For instance, the health monitor can use various health probes to accomplish its job. The health probes 610 can actively monitor an aspect of health of the target machine, e.g., a ping probe monitors connectivity and liveness of the machine. Other health probes may simply query the machine/role for its health—the machine/role can be responsible for maintaining a record of its health, the probe simply queries it periodically.

If an HTTP probe is successful, this may indicate everything is up and running. But since it runs over TCP, it is possible that the DLB might be running out of the sockets or other resources temporarily. It is also possible during a denial of service (DoS) attack that a DLB might be running out of resources (e.g., sockets) for a sustained period of time. One solution to this may be to maintain a persistent HTTP connection. However, most server/browser implementations will timeout persistent TCP connections. For example, some browsers may time out a persistent connection after 60 seconds. Therefore, the health monitor is prepared to renew a persistent connection if it is closed, and should not necessarily view the closure of a persistent connection as indicating a DIP failure.

If another MUX can take over the failed MUX, since all the MUXes run the same consistent hashing function, the packets will be forwarded to the same DLB. Therefore, the flow (e.g., a TCP connection) should not be disturbed.

A separate pool of MUXes may be made available as the hot standby of the active MUXes. The health monitor 608, upon detecting a MUX failure, may start one or more MUXes to take over the IIPs of the failed MUX. At the same time, the health monitor may switch off the failed MUX. To handle planned downtime for MUXes, similar techniques can be used as are used for a hot standby. Since MUXes operate in stateless mode, some implementations can safely switch off a MUX after all the packets have been drained from it.

In at least one embodiment, DLB planned downtime can be handled through stateful MUX map transition.

1. MUX is using a VipMap (V) that uses DLB (D);
2. MUX is notified a DLB (D) is going down in T time;
3. MUX calculates a new VipMap (V') which does not use DLB (D);
4. MUX puts the driver in (V→V' transition mode);
5. In the transition, a state table is kept and every TCP SYN will cause a new entry in the table;
   a. If a packet matches an entry in the state table, it's a new flow and therefore use V';
   b. Otherwise, the old V is used;
   Note: during this transition period, any new flow will switch to the new VipMap (V'), avoiding DLB (D).
6. DLB (D) keeps counting the number of active TCP connections (to VIP). When the counter reaches zero, it notifies the MUX that the transition is completed.
7. Alternatively, MUX can identify long-running connections as connections that do not match any entry in the state table.
8. When time T is reached, the transition V→V' is forced. MUX will forward all traffic based on V'.

In one embodiment, MUX planned downtime is handled via the following steps:

1. Setup the VipMap on the new MUX (M');
2. Setup the old MUX (M) to forward all VIP traffic to M', M' would forward the traffic to the DLBs as usual;
3. Remove the IIP from the old MUX (M);
4. Add the IIP to the new MUX (M'); and,
5. The router should start forwarding to the new MUX.

In at least one embodiment, the health monitor 608 can send periodic probes to MUXes and DLBs to monitor unexpected failures. When a DLB failure is observed, the health monitor can instruct MUX to update its VipMap to avoid using the failed DLB. When a MUX failure is observed, the health monitor can instruct another MUX in the same VLAN to install the IIP (and use G-ARP to announce to the router). In at least one embodiment, the health monitor can send KeepAlive probes every two seconds, and announce a MUX/DLB dead after 3 consecutive failures.

To achieve fast MUX failover (<<1 second) for mission critical VIPs, a virtual group of MUXes for each IIP may be utilized. The cost of this fast failover may be more network usage during normal operation. The following steps can be used to manage the MUXes and IIP for the VIP:

A. Each IIP can be a multicast address. Each VIP has a group of MUXes assigned to it.
B. The master MUX of the group is the actual holder of the IIP.
C. The master MUX sends a multicast announcement that it is the active MUX for this VIP to all the members in this group. This announcement is sent at a high rate (<<1 second). This announcement also prevents other MUXs from starting the new master election process.
D. Since the IIP can be a multicast address, the upstream router replicates every packet it received to the MUX members (the master and all backups) in the VIP group.
E. The designated backup MUX stores the packets for a specified time T.
F. The master MUX performs the load balancing function on the packets and forwards them to DLBs.
G. If no Master-MUX-Is-Alive announcement is received for a given time T. The designated backup MUX will start to load balance and forward all packets in its buffer.
H. The backups in this group will start a new master election process. In some configurations, the designated backup MUX can become the new master.
I. Step G might cause the DLB to receive some packets twice, but TCP tolerates duplicated packets and transient packet loss sufficiently well. Note that packet loss may not occur as long as the upstream router is alive and performing well.

Figure 7:
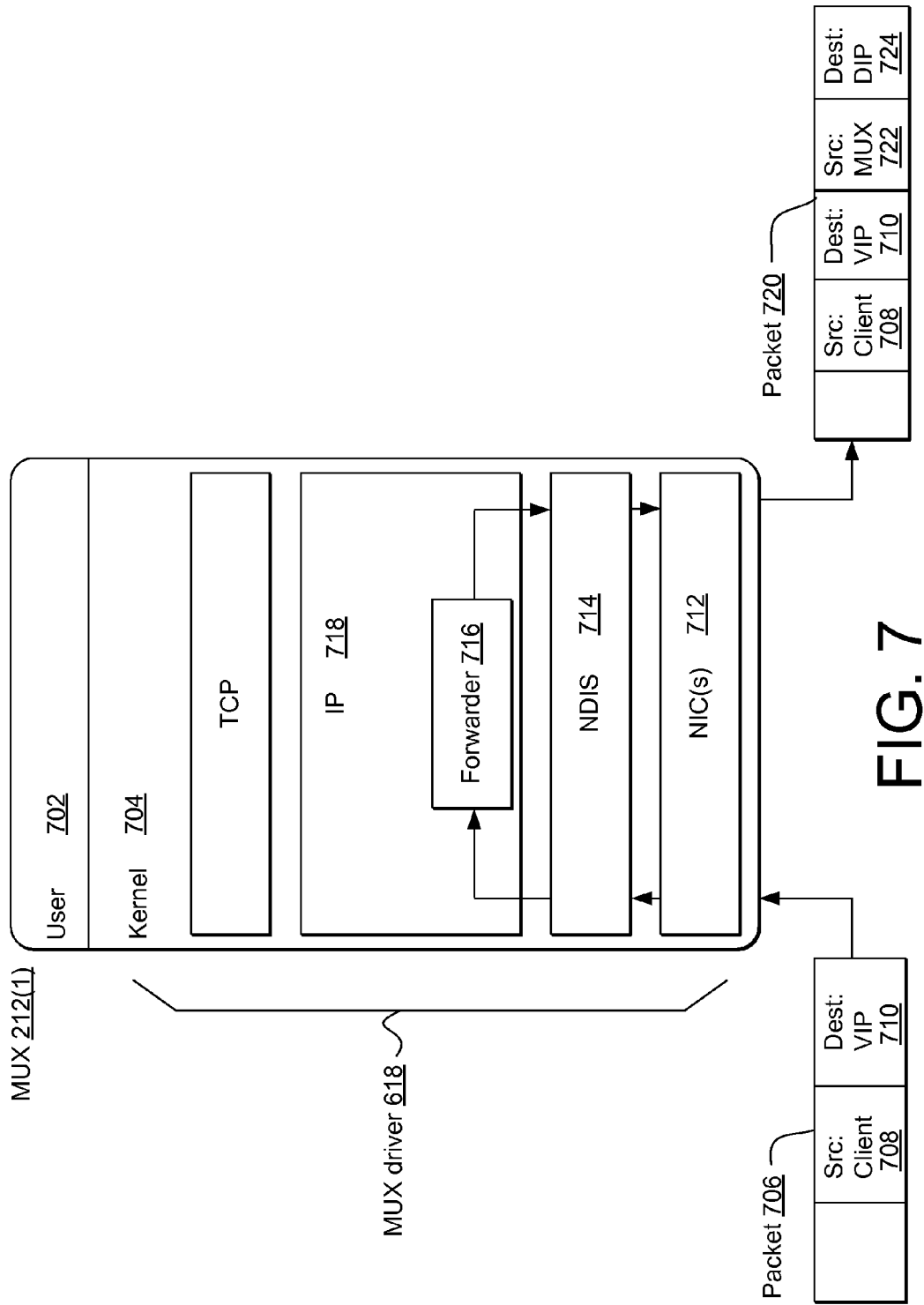
FIGS. 7-8 show some components introduced in FIGS. 1-6 in accordance with some implementations of the present concepts.
Figure 8:
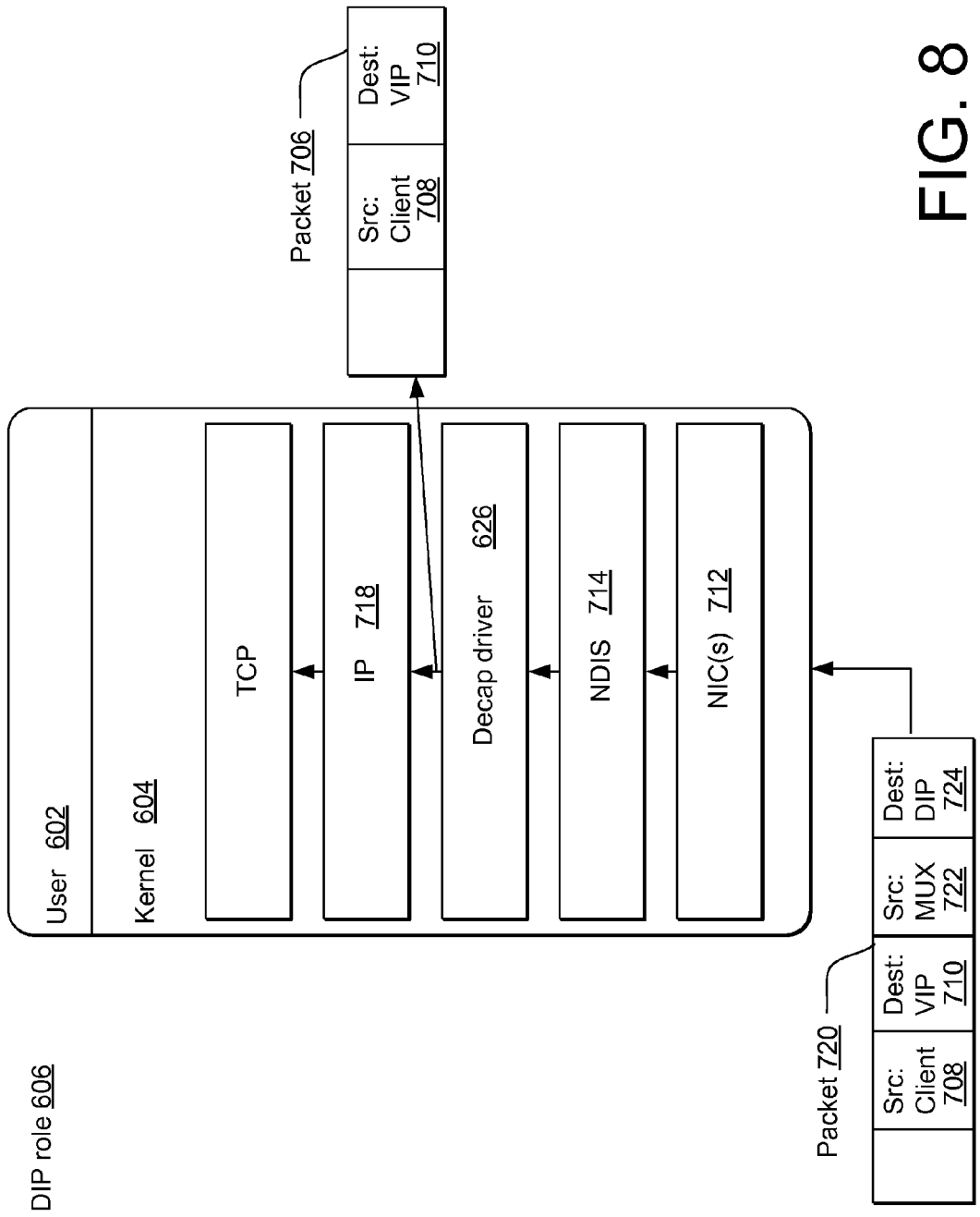

FIG. 7 illustrates an example configuration of MUX 212(1) (introduced in FIG. 2) according to one or more embodiments. Taken collectively, FIGS. 7 and 8 illustrate how packets can be encapsulated and decapsulated along a path.

FIG. 7 involves user mode 702 and kernel mode 704, but concentrates on functionality provided by the MUX's MUX driver 618 in the kernel mode. In this case, the MUX driver is implemented as an extension of the IP layer of the network stack.

In this example, a packet 706 is received by MUX driver 618, such as from an application server. The packet includes a source client address at 708 and a destination VIP address at 710. The packet migrates through the physical Network Interface Card (NIC) layer 712, and the Network Driver Interface Specification (NDIS) layer 714. The packet is handled by the MUX driver's forwarder 716 in the IP layer 718. The forwarder encapsulates packet 706 to generate packet 720. This packet includes the source client address at 708 and the destination VIP address at 710 encapsulated by a source MUX address 722 and a destination DIP address 724. Thus, the original packet 706 is encapsulated in packet 720 in a manner that gives the impression that it is from MUX 212(1) rather than from client 708.

MUX 212(1) can implement layer-4 load balancing, a.k.a., VIP:DIP mapping. Traffic from the clients can be sent to one of the MUX nodes by tier 1 (typically via Equal Cost Multi Path (ECMP) routing.) When MUX 212(1) receives a packet 706, it can hash the packet header fields (it is flexible in terms of which fields are hashed) and can pick a DIP based on this hash. (An example of this process is described below relative to FIG. 9). The MUX can then encapsulate the original packet 706 in a new IP header that indicates the chosen DIP as the destination (i.e., destination DIP address 724) and the MUX as the source IP address. (Alternatively, the MUX can use the original sender as the source IP.)

The MUX nodes in a load balancing cluster can use the same hash function. Furthermore, the MUX nodes can maintain state during addition and graceful-deletion of DIPs. This can allow packets for a given flow to be forwarded to the same server in the next tier regardless of which MUX receives the packet.

FIG. 8 illustrates an example of the DIP role 606 introduced above relative to FIG. 6. Briefly, in this case, DIP decap driver 626 can perform decapsulation on encapsulated packet 720 introduced in FIG. 7. In this configuration, the DIP decap driver is implemented as an extension of the IP layer of the networking stack. As mentioned above, FIG. 7 offers an example for achieving encapsulation at the front end of a delivery path, FIG. 8 offers an example at the back end of decapsulating the original packet 706 introduced above.

In this example, decap driver 626 can receive encapsulated packet 720. The decap driver can remove the encapsulation (i.e., source MUX address 722 and Destination DIP address 724) to produce packet 706 once the encapsulated packet travels over the path and is ready for delivery to destination VIP address 710.

The above described MUX 212(1) and DIP role 606 can be employed with the present concepts to facilitate encapsulation of a packet, such as packet 706 that is associated with an application address (i.e., destination VIP address 710) with a location address (i.e., destination DIP 724) so that the packet 706 can be transported over layer-3 infrastructure and ultimately delivered to the layer-2 destination VIP address 710. Further, the encapsulated packet can travel over a selected path defined by the encapsulation and the selected path can be easily reselected for subsequent packets to avoid congestion.

Further, this configuration can facilitate disruption-free (or reduced disruption) growing and shrinking of a network node pool (i.e., components of scalable load balancing systems 104, 204 and/or 304). Briefly, scalable load balancing system status tends not to be static. For instance, more application servers can come on-line and/or application servers can go off-line, switches can go out or come on, communications are initiated and finalized, etc. The present concepts can allow graceful transitioning from an existing scalable load balancing system mapping to a new scalable load balancing systems mapping. For instance, the present concepts can track existing or ongoing communications of an existing mapping. Some implementations can attempt to maintain continuity for those ongoing communications utilizing the existing mapping while utilizing a new mapping that reflects scalable load balancing system changes for new communications. These implementations can then 'gracefully' transition from the old mapping to the new mapping in a manner that is relatively seamless.

Figure 9:
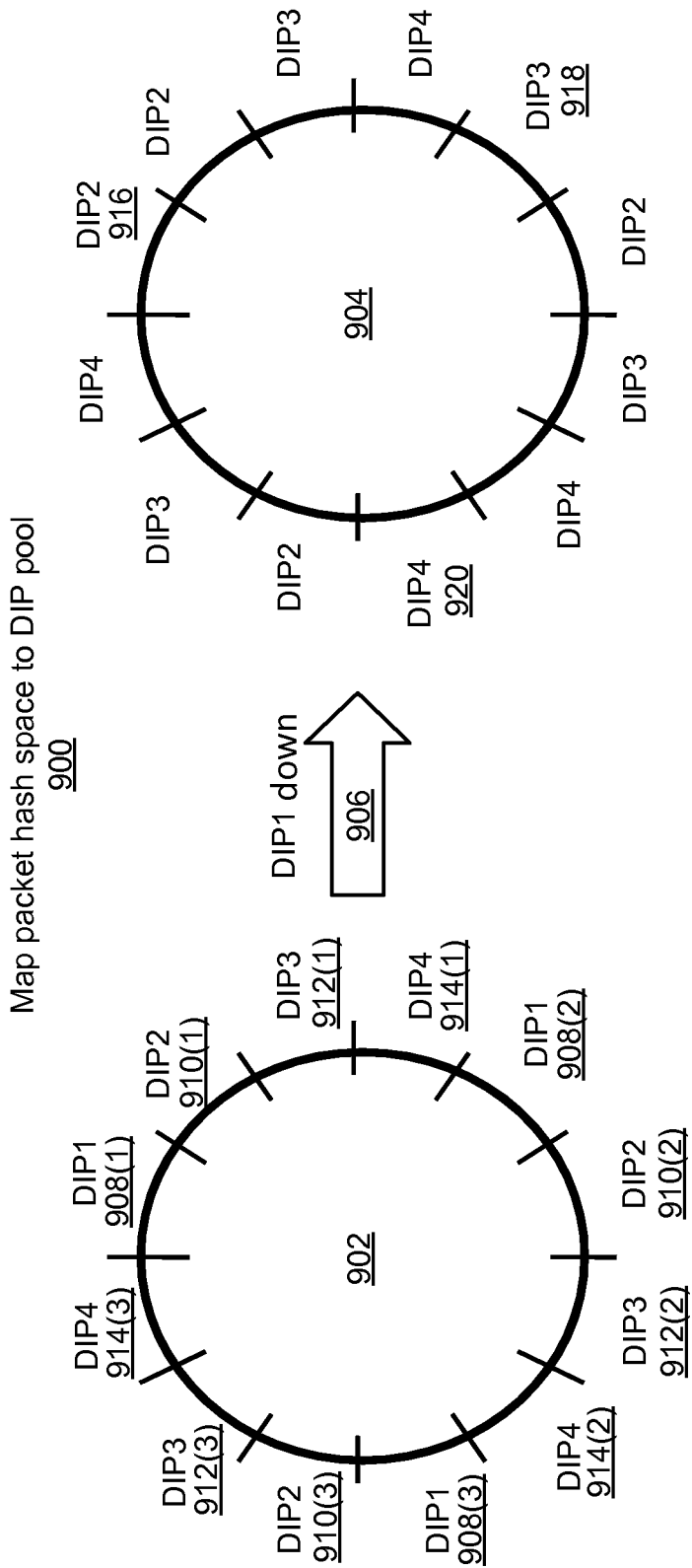
FIG. 9 shows a hash mapping technique that is consistent with some of the present concepts in accordance with some implementations.

FIG. 9 illustrates an example method 900 of mapping a hash space to a DIP pool. For instance, the mapping can allow removal of a DIP from a VIP pool with no disruption to traffic not going to the affected DIP. For instance, a first mapping between a hash space (i.e., potential hash values) and a pool of available DIPs is shown at 902. A second mapping between the hash space and a different pool of available DIPS is shown at 904. In this case, second mapping 904 occurred as a result of DIP 1 going down (i.e., becoming unavailable) as is indicated at 906. Looking initially to first mapping 902, hash values are mapped to DIP 1 at 908(1), 908(2), and 908(3), to DIP 2, at 910(1), 910(2), and 910(3), to DIP3 at 912(1), 912(2), and 912(3), and to DIP 4 at 914(1), 914(2), and 914(3). Thus, hash values are distributed among the available DIPs in a manner that can reduce or avoid bottlenecks.

With the loss of DIP 1 at 906, this implementation redistributes DIP 1's load among the remaining available DIPs in a manner that avoids suddenly overburdening any individual available DIP. For instance, in second mapping 904, the first portion of the hash that was mapped to DIP 1 at 908(1) in first mapping 902 is reassigned to DIP 2 as indicated at 916. DIP 1's second portion 908(2) is reassigned to DIP 3 as indicated at 918. DIP 1's third portion 908(3) is reassigned to DIP 4 as indicated at 920. Thus, this implementation seamlessly, redistributes packet flow from a four-way distribution as seen in first mapping 902 to a three-way distribution as seen in second mapping 904 in an equitable way that can avoid overburdening any of the remaining DIPS and thereby avoids potentially creating a bottleneck associated with an overburdened DIP.

For purposes of a more detailed explanation, consider a MUX (such as MUX 212(1)) that has a VIP-DIP map M which determines a VIP's mapping to one or more application servers (DLBs). Now consider a scenario where M is to be changed to M'. Utilizing the described techniques, M can be changed to M' gracefully. Since there might be long-lived connections, optionally, a deadline T can be defined. The MUX can then change M to M' once T is reached or the graceful change is completed.

Described below is but one example of a way of gracefully changing M to M':

For a packet P, the MUX can compute both H(P) and H'(P), where H(P) can be computed using the map M and H'(P) can be computed using map M'.
- if H(P)=H'(P), forwarding to H(P) is equivalent to forwarding to H'(P);
- if H(P)!=H'(P) and P is SYN (TCP SYN packet, which may initiate a TCP connection), P can be used to set up a new connection, which should go to H'(P), also insert hash (P)→H'(P) can be inserted into a state table S so that this flow can be recognized as having been moved to M';
- if H(P)!=H'(P) and P is not SYN, and hash(P) is not in S, this can be part of an ongoing connection to H(P), so continue to H(P);
- if H(P)!=H'(P) and P is not SYN, and hash(P) is in S, this can be part of an ongoing connection that's already moved to M', so continue to H'(P);
- when T is reached or all DLBs inform that the transition is done, the mapping can be changed from M to M', and the state table S can be flushed.

Correspondingly, the DLB could be informed about the same M→M' transition, and then it can calculate if it (i.e., the DLB) is affected by this transition.

If a DLB decides that it is being transitioned out, it can gracefully drain the connections it has.

For a persistent HTTP connection, the DLB HTTP server can disable 'HTTP Keepalive'. As such, the DLB HTTP server can terminate the underlying TCP connection with a FIN (TCP FIN packet, which completes a TCP connection). The FIN can be thought of as a flag in the TCP header that indicates that the sender of this packet wants to terminate the connection. An external client may re-start a connection. However, this will likely start a new handshake, for which the MUX can route the new TCP connection to the new DLB.

Alternatively, persistent HTTP connections can be handled like the established TCP connections described below.

An established TCP connection might be quiet or busy during the transition period, and HTTP might be expected to close it. Some potential actions are:
1. Let the TCP connection timeout on the client side. Basically, this technique just ignores these TCP connections.
2. Force sending a TCP RST to the client when time T is reached so that the client is informed. Sending a RST does not require having the correct sequence number. As such, this technique can just enumerate through the "established" connections and kill all the established connections.
3. The MUX can maintain state for persistent connections until the DLBs determine that connections affected by transition have been terminated.

When the number of open TCP sockets is 0, the MUX can be informed that the node can be safely removed from the pool.

In summary, the present implementations can use IP-in-IP encapsulation so that DSR can be used across potentially all target devices rather than just a subnet. Further, load balancers can be implemented as scalable logical tiers as desired. The concepts can also preserve connections during system transitions. For instance, DIPs can be added or removed, loads can be rebalanced and/or system capacity can be adjusted while gracefully transitioning connections. Consistent hashing can be achieved at the MUX layer to allow scalability and to allow removal of failed DIPs without keeping state. Further, system monitoring, controlling, and/or managing functions can be co-located with load balancing functions. This can enable a master to ensure address continuity among the MUXes, among other potential advantages.

First Method Example

Figure 10:
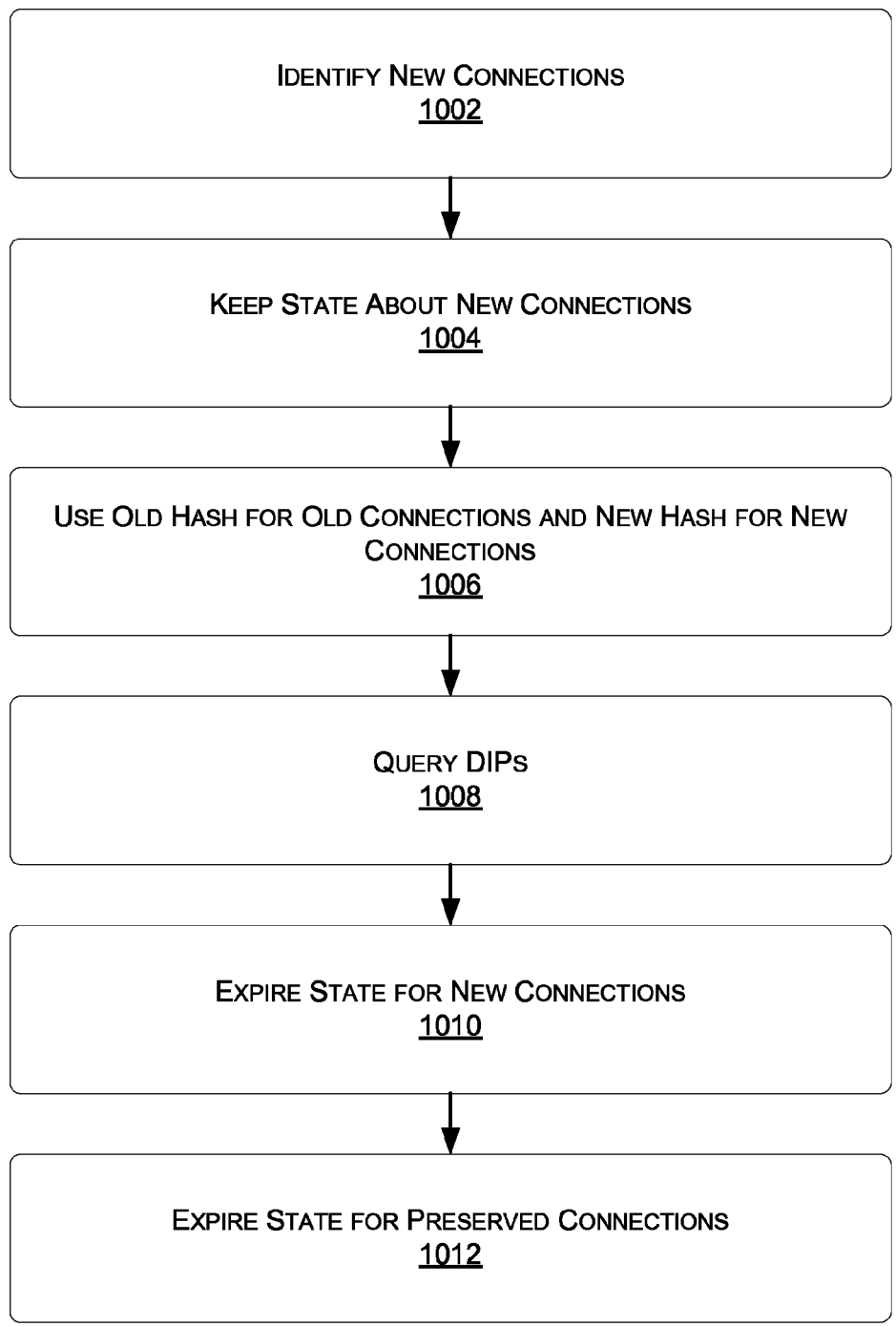
FIGS. 10 and 11 show flowcharts that can implement some of the scalable load balancing concepts in accordance with some implementations.

FIG. 10 illustrates a flow diagram of a method 1000 that describes steps or acts of an example associated with preserving long running connections with respect to expansion of a DIP pool for a VIP, in accordance with one or more embodiments.

The method can be implemented in connection with any suitable hardware, software (e.g., including firmware), or any combination thereof. In some cases, the method can be stored on computer-readable storage media that can be executed by a processor of a computing device to perform the method. Furthermore, one or more of the steps of the method can be repeated any number of times. Additionally or alternatively, one or more of the steps may be omitted in at least some embodiments.

At step 1002, new connections are identified for a network or scalable load balancing system. In at least some embodiments, this can be accomplished by looking for TCP SYN.

At step 1004, state is kept for the new connections.

At step 1006, an existing or old hash is used for existing or old connections and a new hash can be used for new connections.

At step 1008, DIPS are queried. In at least some embodiments, this can include querying DIPS for long-running connections that are to be preserved. Alternatively, the load balancing system can determine active connections by interpreting packet headers.

At step 1010, the state for new connections is expired.

At step 1012, the state for preserved connections is expired. In at least some embodiments, this can include expiring the state for preserved connections as they terminate at the DIPs.

Method 1000 is offered for explanatory purposes and should not be viewed in a limiting manner. For instance, an alternative method that can be employed during a transition can utilize the following algorithm:
1. Identify new connection initiation packet by interpreting packet headers (e.g. look for TCP SYN);
2. If it is a new connection initiation packet, send it only according to the new map;
3. Else send the packet according to both the old and the new map;
4. Identify old connections by asking the DIPs or tracking state at the load balancers over a certain time period;
5. Send old connections according to old map and new connections according to new map; and
6. Expire state about old connections after a timeout or when they terminate on the DIPs.

Second Method Example

Figure 11:
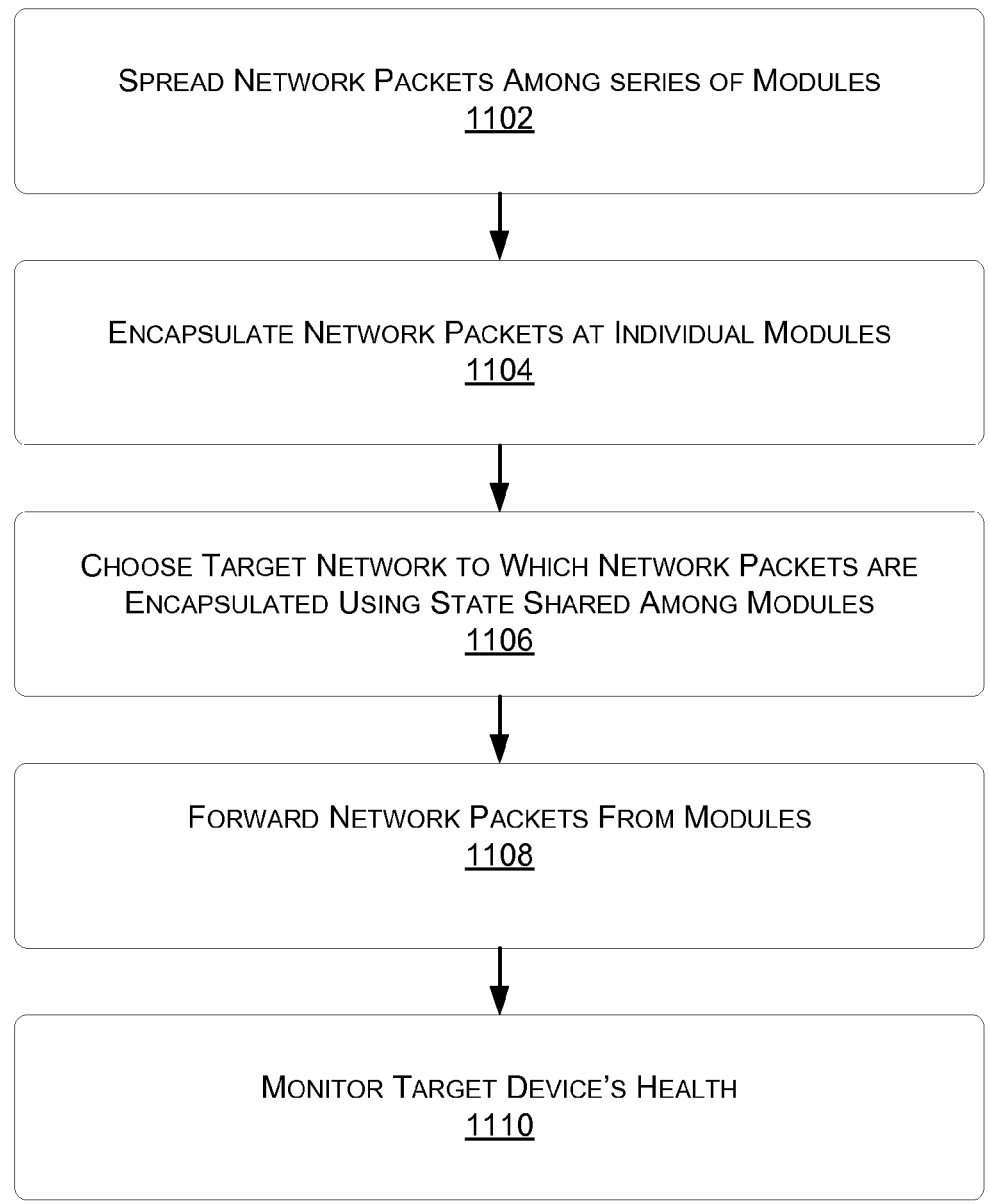

FIG. 11 illustrates a flow diagram that describes steps or acts of an example method 1100. The method can be implemented in connection with any suitable hardware, software (e.g., including firmware), or any combination thereof. In some cases, the method can be stored on computer-readable storage media that can be executed by a processor of a computing device to perform the method. Furthermore, one or more of the steps of the method can be repeated any number of times. Additionally or alternatively, one or more of the steps may be omitted in at least some embodiments.

At step 1102, network packets can be spread among a series of modules. In at least one embodiment, the modules are MUX modules configured to be implemented on servers and/or in routers. The spreading can be oblivious to individual characteristics of the packets, except that packets to a destination may be delivered to a MUX module that contains the state needed to handle packets for that destination. In at least some embodiments, individual network packets are spread among modules using an ECMP router.

At step 1104, network packets can be encapsulated at individual modules. In at least some embodiments, the encapsulation of the packet comprises IP-in-IP encapsulation and/or preserves one or more VIP address to which the packet was sent. In this regard, it should be noted that a potentially valuable feature of the techniques described herein is associated with encapsulating the network packets based on characteristics of the packets (e.g., the 5-tuple, IP src addr, IP dst addr, IP Protocol number, TCP src port, and/or TCP dst port) so that packets that are part of the same request can, in some embodiments, be all handled by the same target device, regardless of which MUX module encapsulates the packet.

At step 1106, a target device to which the network packets are encapsulated using a state shared among the modules can be chosen. In at least some embodiments, the state shared among the modules is a key space of a consistent hash function. Additionally or alternatively, in at least some embodiments, the state shared among the modules can be changed in response to a failure of the target device.

At step 1108, the network packets can be forwarded from the modules.

At Step 1110, the health of the target devices, MUX modules, routers and the routes between various components can be monitored.

Conclusion

Although techniques, methods, devices, systems, etc., pertaining to load balancing scenarios are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A computer-readable storage media having instructions stored thereon that when executed by a processing device performs acts comprising:
   spreading network packets among a series of modules;
   encapsulating the network packets at individual modules;
   choosing a target device to which the network packets are encapsulated using a state shared among the modules of the series; and
   forwarding the network packets from the modules of the series.

2. The computer-readable storage media of claim 1, wherein the state shared among the modules of the series is a key space of a consistent hash function.

3. The computer-readable storage media of claim 1, wherein individual network packets are spread among the modules of the series using Equal-Cost MultiPath routing.

4. The computer-readable storage media of claim 1, further comprising monitoring the target device's health.

5. The computer-readable storage media of claim 1, wherein the state shared among the modules of the series is changed in response to a failure of the target device.

6. The computer-readable storage media of claim 1, wherein a number of the modules of the series can be changed dynamically based on one or more of a load parameter or one or more other parameters without causing downtime for a provided service.

7. The computer-readable storage media of claim 1, wherein the target device is a member of a set of target devices, and in an instance where an indication is received that one or more existing target devices of the set will become unavailable or one or more new target devices are available, transitioning to a configuration that spreads network packets associated with future communications to a new set of target devices while continuing to send network packets associated with ongoing communications to the target devices of the set.

8. The computer-readable storage media of claim 1, wherein encapsulating the network packets comprises internet protocol (IP)-in-IP encapsulation, wherein the IP-in-IP encapsulation preserves a source address and a target address of an individual network packet in an encapsulated packet, and wherein the encapsulated packet has a source address relating to the individual module and a destination address relating to the target device.

9. The computer-readable storage media of claim 6, wherein encapsulating the network packets preserves one or more Virtual IP addresses to which the network packets were sent.

10. The computer-readable storage media of claim 1, wherein the individual modules use packet modification and internet protocol (IP) options to preserve a Virtual IP address to which the network packets were sent.

11. A method comprising:
   spreading network packets among a series of modules;
   encapsulating an individual network packet at an individual module so as to preserve a source address and a destination address of the individual network packet as received by the individual module;
   choosing a target device to which the individual network packet is encapsulated to provide an encapsulated packet using a state shared among the modules, wherein the encapsulated packet includes the individual network packet with the preserved source address and preserved destination address and wherein a source address of the encapsulated packet relates to the individual module and a destination address of the encapsulated packet relates to the target device; and,
   forwarding the encapsulated packet from the individual module for the target device.

12. The method of claim 11, further comprising:
   receiving the encapsulated packet at the target device;
   decapsulating and processing the encapsulated packet at the target device; and
   responding to the preserved source address of the individual network packet with one or more different network packets that do not traverse the individual module.

13. The method of claim 12, wherein the individual module uses packet modifications and internet protocol (IP) options to preserve the source address and the destination address; and wherein the target device responds to the preserved source address of the individual network packet contained in the IP options with one or more packets that do not traverse the individual module.

14. The method of claim 11, wherein the encapsulating is performed by a multiplexer of one or more network load balancers.

15. A system comprising:
   a load balancing layer configured to encapsulate individual incoming packets of a packet flow from an external client device, the load balancing layer further configured to route the individual incoming packets to target devices of the system, wherein the target devices span one or more internet protocol (IP) subnets, and wherein the individual incoming packets pass through one or more load balancers of the load balancing layer before reaching individual target devices; and,
   the individual target devices configured to generate outgoing packets and further configured to route at least some of the outgoing packets of the packet flow to the external client device without passing through any of the one or more load balancers.

16. The system of claim 15, wherein the load balancing layer is configured to encapsulate the individual incoming packets utilizing one or both of internet protocol (IP)-in-IP encapsulation or packet modification and IP options.

17. The system of claim 15, wherein the load balancing layer comprises at least one dynamic load balancer and at least one multiplexer and wherein the at least one multiplexer is configured to encapsulate the individual incoming packets.

18. The system of claim 15, wherein the load balancing layer comprises at least one multiplexer and wherein the at least one multiplexer is configured to encapsulate the individual incoming packets utilizing IP-in-IP encapsulation.

19. The system of claim 15, wherein the individual target devices include a decapsulation component configured to decapsulate packets from the load balancing layer or wherein individual target devices span multiple virtual local area networks.

20. The system of claim 15, wherein the one or more load balancers comprise dynamic load balancers that are configured to provide an application program interface to mange virtual IP (VIP) to direct IP (DIP) mappings of the load balancing layer.

\* \* \* \* \*